US006857981B2

(12) United States Patent  
Hori et al.

(10) Patent No.: US 6,857,981 B2  
(45) Date of Patent: Feb. 22, 2005

(54) ROTARY ACTUATOR

(75) Inventors: Masashi Hori, Nukata-gun (JP); Hironori Asa, Okazaki (JP); Kiyoshi Kimura, Kariya (JP); Shigeru Yoshiyama, Kariya (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 0 days.

(21) Appl. No.: 10/619,460

(22) Filed: Jul. 16, 2003

(65) Prior Publication Data

US 2004/0072646 A1 Apr. 15, 2004

(30) Foreign Application Priority Data

Jul. 22, 2002 (JP) ........................................ 2002-212347

(51) Int. Cl.[7] .............................................. F16H 48/06
(52) U.S. Cl. ...................................... 475/149; 475/153
(58) Field of Search .................................. 475/149, 153

(56) References Cited

U.S. PATENT DOCUMENTS 5,479,058 A * 12/1995 Seidou ........................ 310/83
6,280,359 B1 * 8/2001 Moskob ..................... 475/149
6,661,139 B1 * 12/2003 Moskob ...................... 310/83
6,676,554 B2 * 1/2004 Dal Pra' .................... 475/149
6,727,614 B2 * 4/2004 Neubauer et al. ............ 310/83

FOREIGN PATENT DOCUMENTS

| JP | 62-132053  | 6/1987  |
| JP | 5-60217    | 3/1993  |
| JP | 8-226498   | 9/1996  |
| JP | 2001-271925 | 10/2001 |

* cited by examiner

*Primary Examiner*—Dirk Wright  
(74) *Attorney, Agent, or Firm*—Nixon & Vanderhye P.C.

(57) ABSTRACT

A rotary actuator has a synchronous motor and an internally meshing planetary reduction gear having a first shaft rotated by the synchronous motor, an outer gear mounted to said first shaft with an eccentric part so as to be eccentrically rotatable around said first shaft, an inner gear with which said outer gear meshes internally, and a second shaft connected to said outer gear with a transmission means that only transmits said outer gear rotation on its axis to the second shaft. The synchronous motor and the internally meshing planetary reduction gear are accommodated inside a housing, and the first shaft doubles as a rotor shaft of the synchronous motor. An incremental encoder provided along a rotary shaft of the synchronous motor detects the rotation angle of a rotor of the synchronous motor.

9 Claims, 10 Drawing Sheets

(A) REVERSE ROTATION (B) NORMAL ROTATION

ROTARY ACTUATOR

CROSS REFERENCE TO RELATED APPLICATION

This application is based upon, claims the benefit of priority of, and incorporates by reference, the contents of Japanese Patent Application No. 2002-212347 filed Jul. 22, 2002.

BACKGROUND OF THE INVENTION

1. Field of the Invention

The present invention relates to a rotary actuator for rotating a driven member, particularly suited for high load applications.

2. Description of the Related Art

Known techniques relating to rotary actuators include the following:

1) Driving a driven member directly with the output shaft of a motor as shown, for example, in Japanese Patent Laid-Open Publication No. 2001-271925;

2) Increasing the output torque of a motor with a worm and wheel set and driving a driven member with the output shaft of the worm reduction gear as shown, for example, in Japanese Patent Laid-Open Publication No. Hei 5-60217; and 3) Increasing the output torque of a motor with a spur gear set and driving a driven member with the output shaft of the spur reduction gear.

With the prior art 1 device above, the motor size increases as the load increases, because of the structure that drives the driven member directly with the output shaft of the motor. For example, in high torque applications such as a servo mechanism for the switching operation of a parking lock and shift range selector of a vehicle, the motor according to the prior art 1 will have to be substantially large. However, the spacing between the automatic transmission and vehicle body is usually as small as 40 to 50 mm for more interior space, and a bulky motor in such an application is problematic. That is, the vehicle body design may have to be changed so as to accommodate the large motor, resulting in smaller interior space.

The prior art 2 device above requires a damper or the like to prevent a lock between the worm and wheel in the worm reduction gear. The worm and wheel engage each other in a small number of points in this reduction gear, and in order to accommodate higher loads, the system needs to be larger. If this system is to be used for the aforementioned servo mechanism in a vehicle which experiences high loads, it will present the same problems as noted above because of its size, i.e., it will hardly be mountable in the small space between the automatic transmission and vehicle body, and the vehicle body design may have to be changed, resulting in less interior space.

The prior art 3 device above also needs to be larger to accommodate higher loads for the same reason as noted above, because the plurality of spur gears engage each other in a small number of points. If this system is to be used for the aforementioned servo mechanism in a vehicle which experiences high loads, it will present the same problems as noted above because of its size, i.e., it will be difficult to mount in the small space between the automatic transmission and vehicle body, and the vehicle body design may have to be changed, resulting in a smaller interior space.

SUMMARY OF THE INVENTION

The present invention has been devised with the above circumstances in mind, and an object of the present invention is to provide a compact rotary actuator having a high load capacity.

To achieve the above object, the rotary actuator according to a first aspect of the present invention includes a synchronous motor and an internally meshing planetary reduction gear. Because the gears mesh each other in multiple points, this type of gear has a higher load capacity than a spur or worm reduction gear of the same size. In other words, the reduction gear can be made smaller than the conventional types while having the same load capacity. The rotary actuator, including this reduction gear, is accordingly made smaller.

Because the reduction gear bears the load in multiple points, it has excellent durability and high reliability, contributing to the high durability and reliability of the rotary actuator. Moreover, because the outer gear of the reduction gear meshes internally with the inner gear, the axial dimensions are made smaller, which in turn reduces the axial dimensions of the rotary actuator.

According to a second aspect of the present invention, the synchronous motor and the internally meshing planetary reduction gear may be accommodated inside one housing, and the rotor shaft of the motor may double as the first shaft of the reduction gear. Thereby, the rotary actuator can be constructed even smaller.

According to a third aspect of the present invention, the rotary actuator may include an incremental encoder provided along the rotary shaft of the synchronous motor for detecting rotation angles of the rotor of the motor. Thereby, non-synchronization of the motor is prevented and high speed, high response performance is achieved.

According to a fourth aspect of the present invention, the incremental encoder may be constructed with a magnet that rotates integrally with the rotor and has multiple poles along the rotating direction. Additionally, a magnetic flux detecting means is fixed to the housing for accommodating the synchronous motor for detecting a change in magnetic flux when the magnet is rotated.

According to a fifth aspect of the present invention, the synchronous motor may be a switched reluctance motor. In such a case, the following effects will be achieved:

(1) Because the motor does not use a permanent magnet, a possible lock of the rotary actuator caused by a cracked, chipped, or dusted piece of magnet is prevented.

Malfunctions of surface permanent magnet (SPM) synchronous motors caused by a permanent magnet being separated from the rotor due to centrifugal force are often reported. There are also cases where the permanent magnet separates from the rotor because of repeated, rapid, acceleration and deceleration as well as particular thermal effects.

The output of the motor employing a permanent magnet decreases as the temperature increases because the magnetic force of a permanent magnet decreases under high temperature conditions. Accordingly, SPM motors need to be designed large to allow for reduced output to the load, or the surface area of the housing needs to be made large for efficient heat dissipation.

(2) Because the motor does not use a permanent magnet, it generates very little reverse electromotive force. Also, the rotor moment of inertia is small, and hence, rapid acceleration/deceleration and high (quick) response are achieved.

(3) Because the motor does not generate cogging torque, positioning with a mechanism using a spring provided on the driven member or on the rotary actuator is possible, with less mechanical stress.

(4) Because the motor is a type of a stepping motor, high positioning precision is achieved.

(5) With a stepping motor, the rotation position can be determined by counting the number of switchovers of power supply. Accordingly, rotation position control is possible even without means for detecting the rotation angle of the rotor.

(6) The motor has high start-up torque and is advantageously used for driving a driven member which requires a high load to start.

According to a sixth aspect of the present invention, the rotary actuator may include an output angle detecting means for detecting a rotation angle of the second shaft of the reduction gear.

According to a seventh aspect of the present invention, the rotary actuator may be mounted in a vehicle and used as a servo mechanism for positioning purposes.

According to a seventh aspect of the present invention, the rotary actuator may be used as the servo mechanism for switching between a lock state and an unlock state of a vehicle parking lock device.

According to an eighth aspect of the present invention, the rotary actuator may be used as the servo mechanism for switching between shift range positions of an automatic transmission of the vehicle.

According to a tenth aspect of the present invention, the reduction gear may include a transmission means, which includes a plurality of inner pin holes formed on a circle on a flange that rotates integrally with the second shaft of the reduction gear, and a plurality of inner pins fixed to the outer gear at one end and loosely fitted in the inner pin holes.

According to an eleventh aspect of the present invention, the reduction gear may include a transmission means, which includes a plurality of inner pin holes formed on a circle on the outer gear, and a plurality of inner pins fixed at one end to a flange that rotates integrally with the second shaft of the reduction gear.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Preferred embodiments of the present invention will be hereinafter described with reference to the accompanying drawings.

Figure 1:
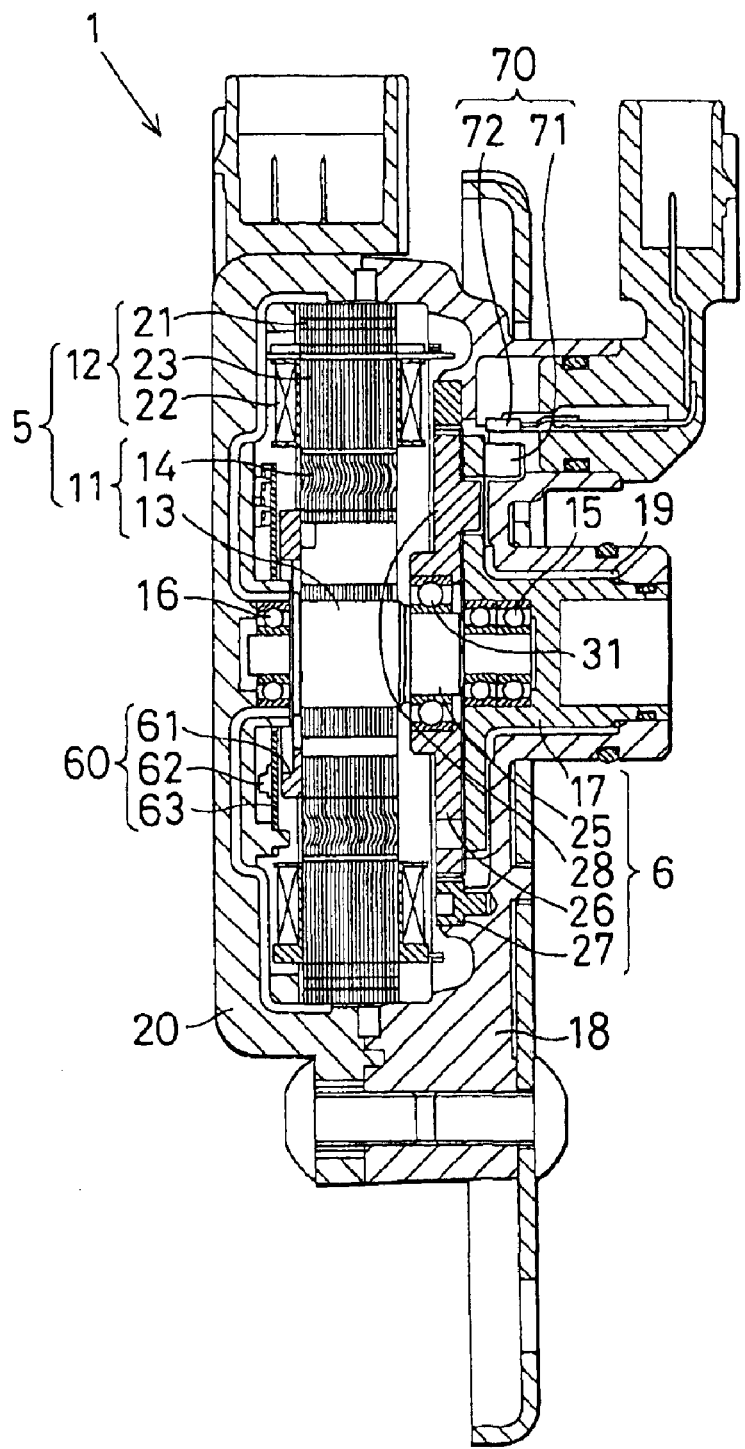
FIG. 1 is a cross-sectional view of a rotary actuator.
Figure 2:
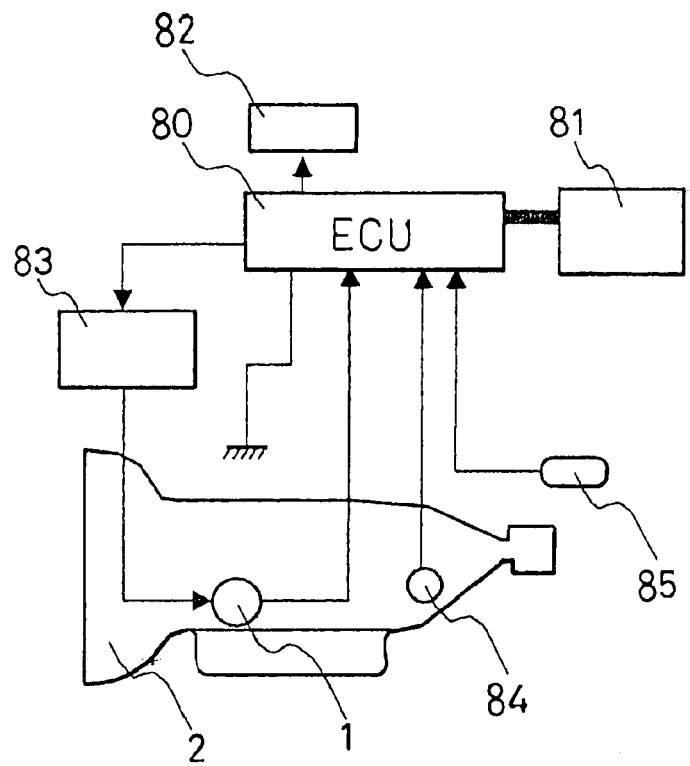
FIG. 2 is a system design diagram of a shift range selector.
Figure 3:
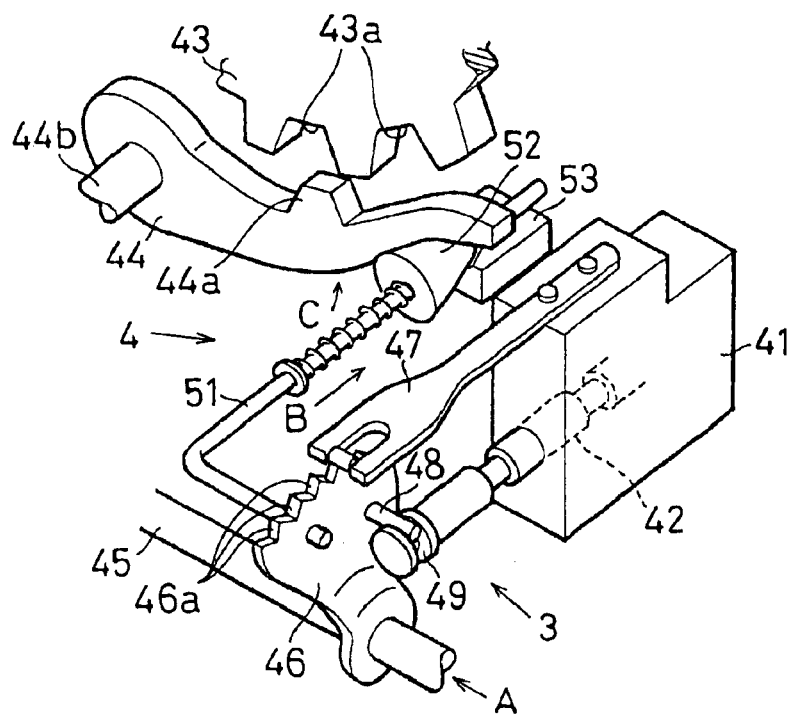
FIG. 3 is a perspective view of the shift range selector including a parking lock.

FIG. 1 shows one preferred embodiment of the invention adapted as a rotary actuator 1 incorporated in a shift range selector 3 including a parking lock 4 shown in FIG. 3 mounted in an automatic transmission 2 shown in FIG. 2 for a vehicle.

The rotary actuator 1 is used as a servo mechanism for driving the shift range selector 3 and is composed of a synchronous motor 5 (hereinafter "motor") and an internally meshing planetary reduction gear 6 (hereinafter "reduction gear"). In the following description, the right side of FIG. 1 is known as the front side, and the left side is known as the rear side.

Figure 4:
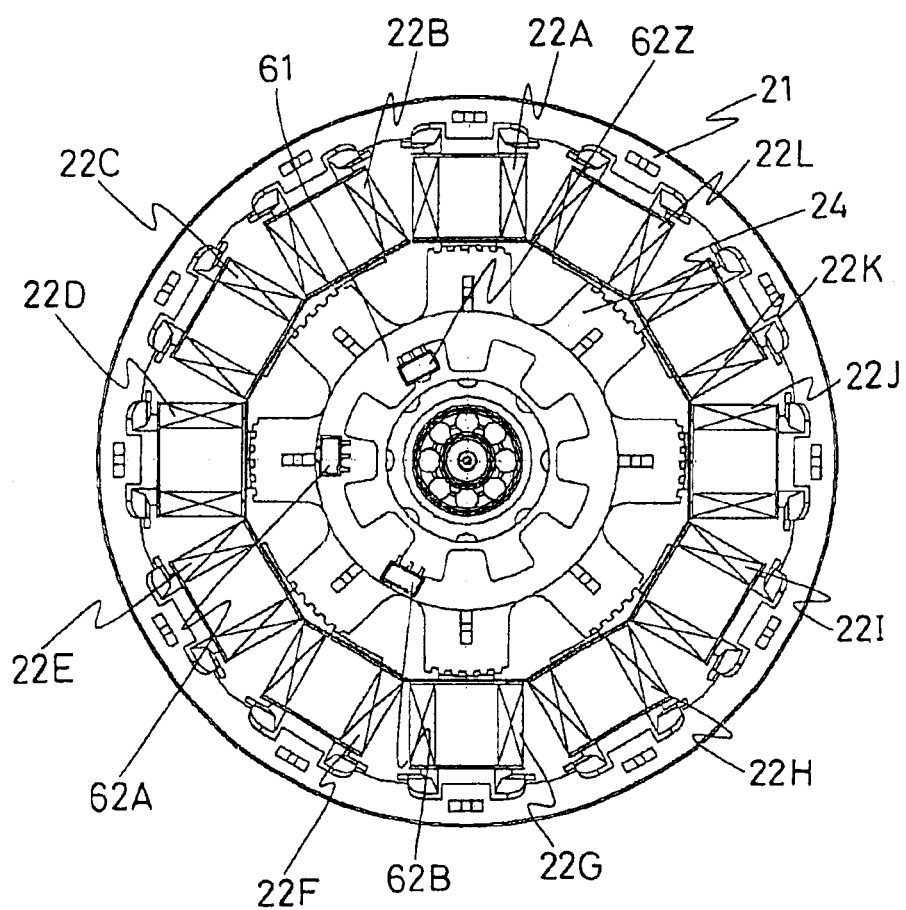
FIG. 4 is a front view of a motor.
Figure 5:
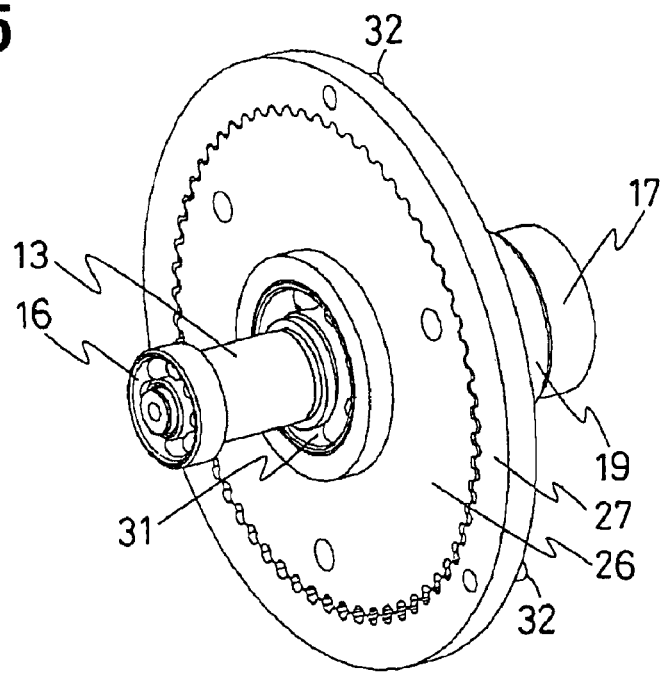
FIG. 5 is a perspective view of a reduction gear seen from the rear side.
Figure 6:
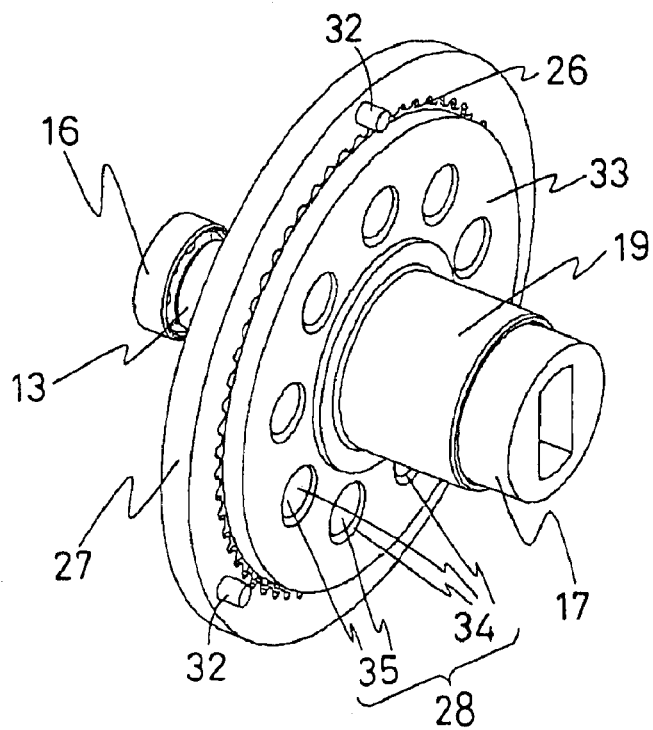
FIG. 6 is a perspective view of the front side of the reduction gear.
Figure 7:
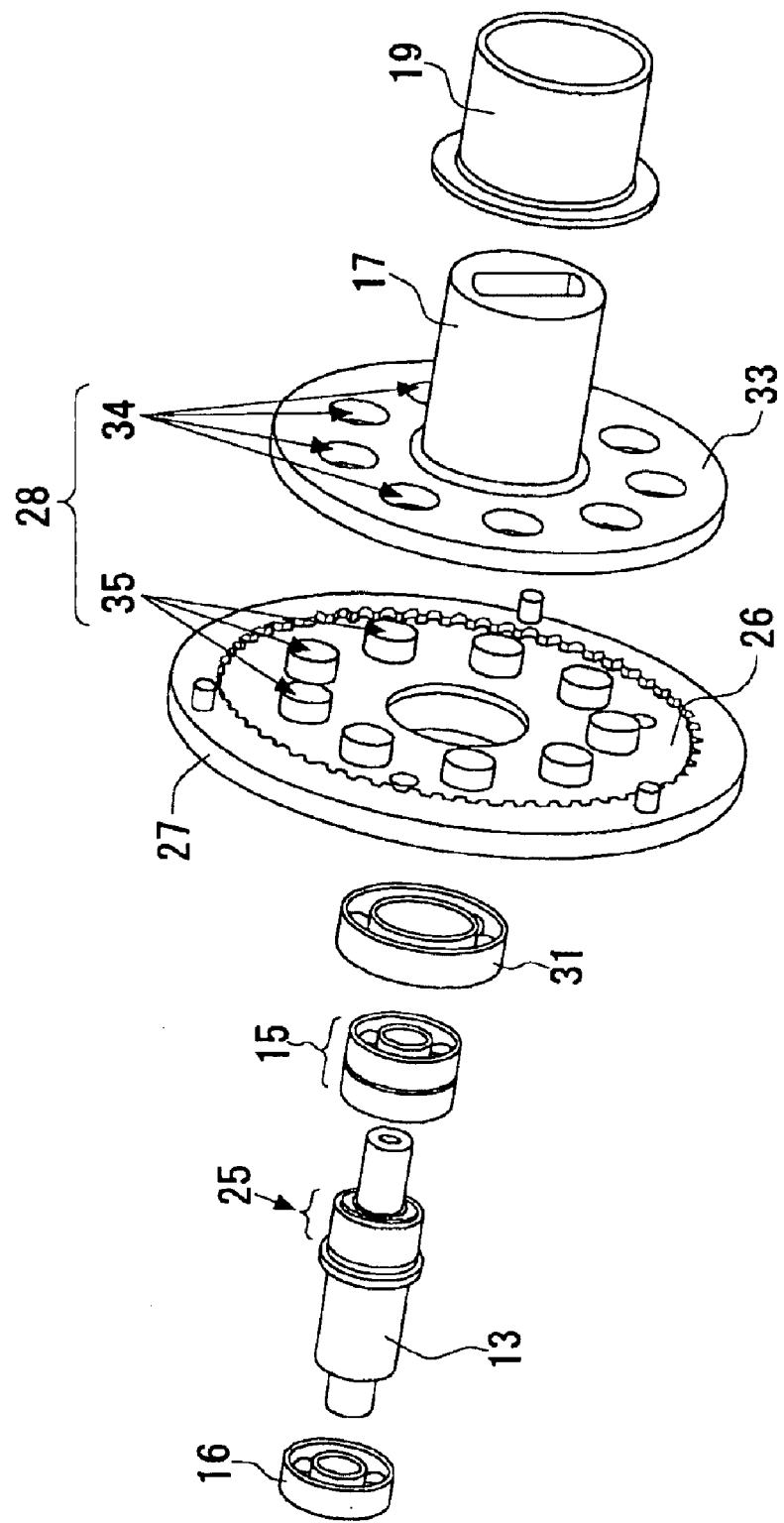
FIG. 7 is an exploded perspective view of the reduction gear as seen from the front side.

The motor 5 shown in FIG. 1 and FIG. 4 is a switched reluctance (SR) motor that does not use a permanent magnet as a part thereof and is constructed with a rotatably supported rotor 11 and a stator 12 coaxial with the rotor 11. The rotor 11 includes a rotor shaft 13 (first shaft) and a rotor core 14. The first shaft 13 is rotatably supported by first and second roller bearings 15 and 16 arranged at the front and rear ends, respectively. The first roller bearing 15 is arranged on the inner periphery of the output shaft 17 (second shaft) of the reduction gear 6, and the output shaft 17 is rotatably supported by a metal bearing 19 in the inner periphery of a front housing 18. Thus the front end of the first shaft 13 is rotatably supported in the front housing 18 by the first roller bearing 15 via the second shaft 17 and the metal bearing 19.

The axial supporting span of the metal bearing 19 overlaps that of the first roller bearing 15, so as to prevent tilt of the first shaft 13 that is caused by a reaction force from the reduction gear 6, particularly a reaction force against the load applied to an engaging outer gear 26 and an inner gear 27, to be described later. The second roller bearing 16 is supported in a rear housing 20.

The stator 12 includes a stator core 21 and coils 22 (22A–22L in FIG. 4). The stator core 21 has stator teeth 23 protruded at 30° spacing towards the rotor 11, and the coils 22A–22L are wound around each of the teeth 23. The Coils 22A, 22D, 22G, and 22J produce a U-phase output, coils 22B, 22E, 22H, and 22K a V-phase output, and coils 22C, 22F, 22I, and 22L a W-phase output.

The rotor core 14 has pole pieces 24 that are spaced 45° apart and protrude toward the stator 12. Supplying power in the order of W-, V-, and U-phase from the state shown in FIG. 4 rotates the rotor 11 counterclockwise, while supplying power in the order of V-, W-, and U-phase rotates the rotor 11 clockwise. The rotor 11 rotates 45° per one round of power supply to the U-, V-, and W-phase.

Additionally, it is possible to instantaneously stop the rotor of the actuator, to hold the rotor of the actuator at the stopped position, and to instantaneously switch the rotating direction of the rotor of the actuator. Since the actuator is controlled while the rotation position of the rotor is continuously monitored, it is possible to know which coil needs to be energized to instantaneously stop or reverse the rotation of the rotor.

Although the synchronous motor has the above described advantages, the synchronous motor has the rotational positional resolution that largely depends on the number of coils and the number of poles with respect to the stopping of the rotor and the switching of the rotating direction of the rotor. This rotational positional resolution of the synchronous motor is relatively large for the rotary actuator and is thus not suitable for performing fine positional control. Therefore, it is required to combine the speed reduction device with the synchronous motor to improve the rotational positional resolution.

However, due to the relatively high start-up torque of the synchronous motor, when the synchronous motor is instantaneously stopped or instantaneously switched to change its rotational direction, the gear of the speed reduction device could be jammed at its meshed portion. Contrary to this, the internally meshing planetary reduction gear (also, referred to as an internally meshing planetary reduction gear device) always support the meshing load through multiple points. Thus, even when the internally meshing planetary reduction gear is used in the above described way, the jamming of the gear is not likely to occur. Because of this, the internally meshing planetary reduction gear is combined with the synchronous motor.

[Description of Reduction Gear 6]

The reduction gear 6 shown in FIG. 1 and FIG. 5 to FIG. 7 includes the first shaft 13 which doubles as the rotor shaft of the motor 5, an outer gear 26 mounted on the first shaft 13 with an eccentric part 25 so that it rotates eccentrically relative to the shaft 13, an inner gear 27 with which the outer gear 26 meshes internally, and the second shaft 17 connected via transmission means 28 that only transmits the rotation of the outer gear 26 on its axis.

The eccentric part 25 is formed of a shaft that rotates eccentrically to the center of the first shaft 13 so as to shift the rotating position of the outer gear 26. The eccentric part 25 rotatably supports the outer gear 26 by a third roller bearing 31 arranged on its outer periphery. Thus rotation of the eccentric part 25 rotates the outer gear 26 around the first shaft 13 via the third roller bearing 31, while pressing it against the inner gear 27. The inner gear 27 is fixed to the housing 18 with fixing bosses 32 formed on the front face.

The transmission means 28 includes a plurality of inner pin holes 34 formed along a circle on a flange 33 that rotates integrally with the second shaft 17, and a plurality of inner pins 35 fixed on the outer gear 26 at one end and loosely fitted in the holes 34. These inner pins 35 protrude on the front face of the outer gear 26. The flange 33 is provided at the rear end of the second shaft 17. Thus the engagement between the inner pins 35 and the inner pin holes 34 transmits the rotation of the outer gear 26 to the second shaft 17. Rotation of the first shaft 13 is reduced through the eccentric rotation of the outer gear 26 and transmitted to the second shaft 17, which is connected to a control rod 45 to be descried later of the shift range selector 3.

The configuration of the transmission means 28 may suitably be modified. For example, the inner pin holes 34 may be formed along a circle on the outer gear 26, and the inner pins 35 may be fixed on a flange 33 that rotates integrally with the second shaft 17.

[Description of Shift Range Selector 3]

The shift range selector 3 shown in FIG. 3 including the parking lock 4 is a driven member in this embodiment, which is driven by the second shaft 17 of the above reduction gear 6. A switchover between various shift range positions (P, R, N, D) of the automatic transmission 2 is achieved by sliding movement of a manual spool valve 42 in the pneumatic control box 41 into suitable positions.

The switchover of the parking lock 4 is achieved by engagement and disengagement between an indentation 43a of a park gear 43 and a protrusion 44a of a park pole 44. The park gear 43 is connected to the output shaft (not shown) of the automatic transmission 2 via a differential gear (not shown). Restricting rotation of the park gear 43 locks the drive wheels of the vehicle, thereby locking the parking state.

To the control rod 45 driven by the reduction gear 6 is attached a fan-shaped detent plate 46 with a spring pin (not shown) or the like. The detent plate 46 has a plurality of dents 46a at the radial distal end along the circular arc. A plate spring 47 fixed on the pneumatic control box 41 engages with one of these dents 46a, thereby maintaining the selected shift range position.

The detent plate 46 has a pin 48 that fits in a groove 49 formed at one end of the manual spool valve 42 for driving the same. When the detent plate 46 is rotated by the control rod 45, the pin 48 moves along a circular arc, thus causing a linear movement of the manual spool valve 42 inside the pneumatic control box 41.

A clockwise rotation of the control rod 45, when viewed from the direction of arrow A of FIG. 3, causes the pin 48 to push the manual spool valve 42 into the pneumatic control box 41, via the detent plate 46, thereby changing the oil passage therein in the order of D, N, R, and P positions, corresponding to the D, N, R, and P range positions of the automatic transmission 2. A counterclockwise rotation of the control rod 45 moves the pin 48 to pull the manual spool valve 42 out of the pneumatic control box 41, changing the oil passage therein in the order of P, R, N, and D positions, corresponding to the P, R, N, and D range positions of the automatic transmission 2.

The detent plate 46 further has a park rod 51 having a conical part 52 at the distal end for driving the park pole 44. The conical part 52 is located between a protruded portion 53 of the housing of the automatic transmission 2 and the park pole 44. When the control rod 45 is rotated clockwise, when viewed from the direction of arrow A of FIG. 3, from the R to the P range position, the detent plate 46 moves the park rod 51 in the direction of arrow B in FIG. 3 so that the conical part 52 pushes up (raises) the park pole 44. The park pole 44 then turns in the direction of arrow C around the shaft 44b, bringing the protrusion 44a into engagement with the indentation 43a of the park gear 43, whereby the lock state of the parking lock 4 is achieved.

A rotation of the control rod 45 in the reverse direction, e.g., from the P to the R range position, pulls the park rod 51 back in the opposite direction from arrow B in FIG. 3, thereby canceling the force that pushes up the park pole 44. Since the park pole 44 is biased with a twisted coil spring (not shown) in the opposite direction from arrow C, the protrusion 44a disengages from the indentation 43a and frees the park gear 43, thereby unlocking the parking lock 4.

The rotary actuator 1 includes an incremental encoder 60 (hereinafter "encoder") inside the space formed by the front housing 18 and rear housing 20 for detecting the rotation angle of the rotor 11. This encoder 60 will be described with reference to FIG. 1, FIG. 4, and FIG. 8 to FIG. 12. Detecting the rotation angle of the rotor 11 using the encoder 60 enables high speed operation of the motor 5 without non-synchronization and ensures high response.

Figure 8:
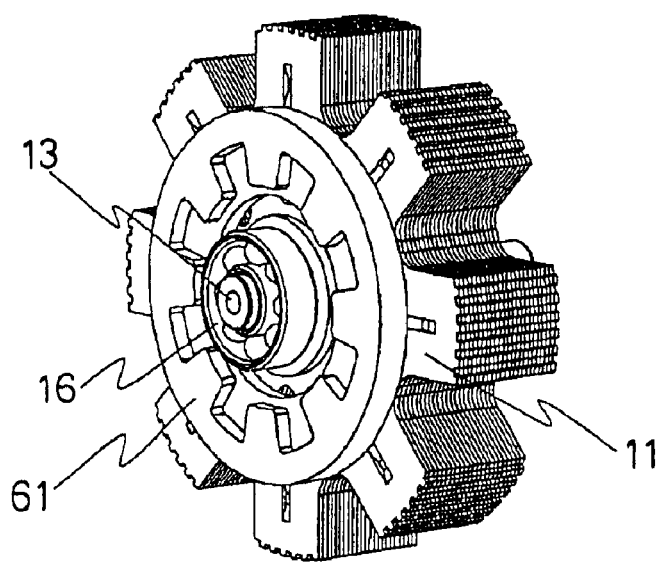
FIG. 8 is a perspective view of a rotor as seen from the rear side.
Figure 9:
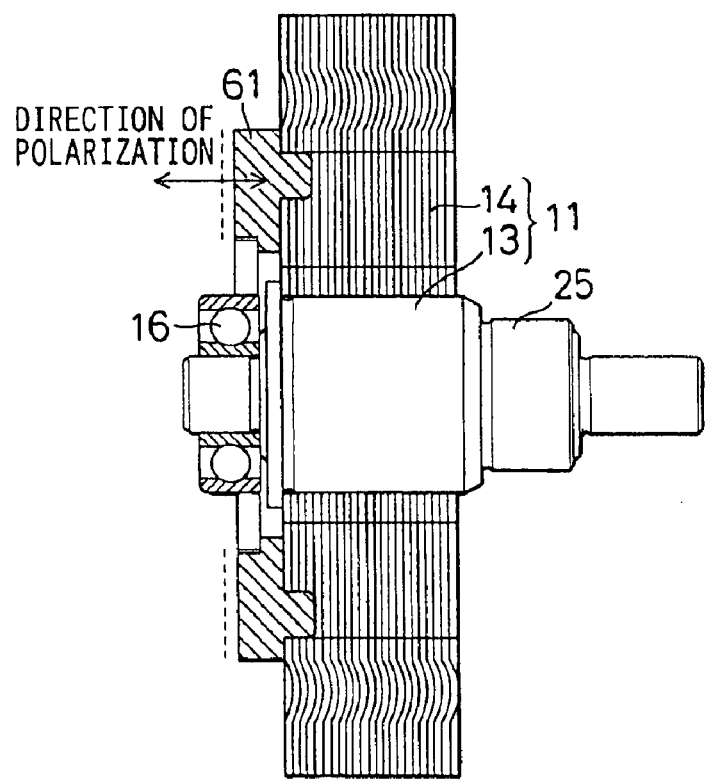
FIG. 9 is a cross-sectional view of the rotor in which a magnet is mounted.

The encoder 60 includes a magnet 61 that rotates integrally with the rotor 11 and magnetic flux change detecting means 62 fixed to the rear housing 20, which is made up of first to third sensors 62A, 62B, and 62Z. The magnet 61 is substantially ring-shaped and coaxial with the first shaft 13 of the rotor 11 as shown in FIG. 8. The magnet 61 is magnetized such that a magnetic force is generated in an axial direction of the rotor 11 as shown in FIG. 9. A large number of N and S poles alternate in the rotating direction of the rotor 11 as shown in FIG. 10, the magnetic flux coming out of the N poles substantially parallel to the first shaft 13 and entering the S poles.

Figure 10:
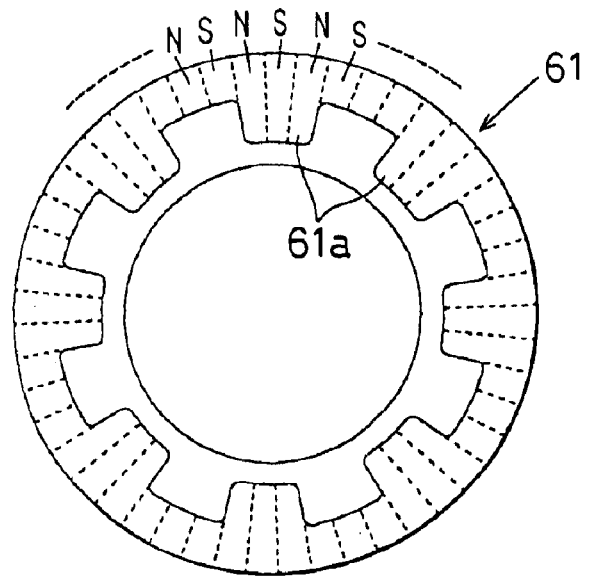
FIG. 10 is a plan view of the magnet illustrating a state of magnetization.
Figure 12A:
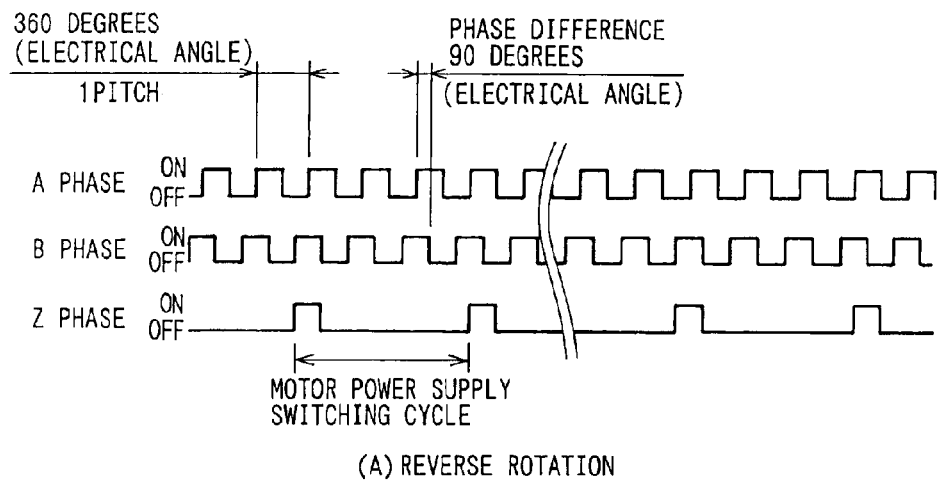
FIG. 12A is a reverse rotation output waveform chart of A-, B-, and Z-phase when the rotor is rotated.
Figure 12B:
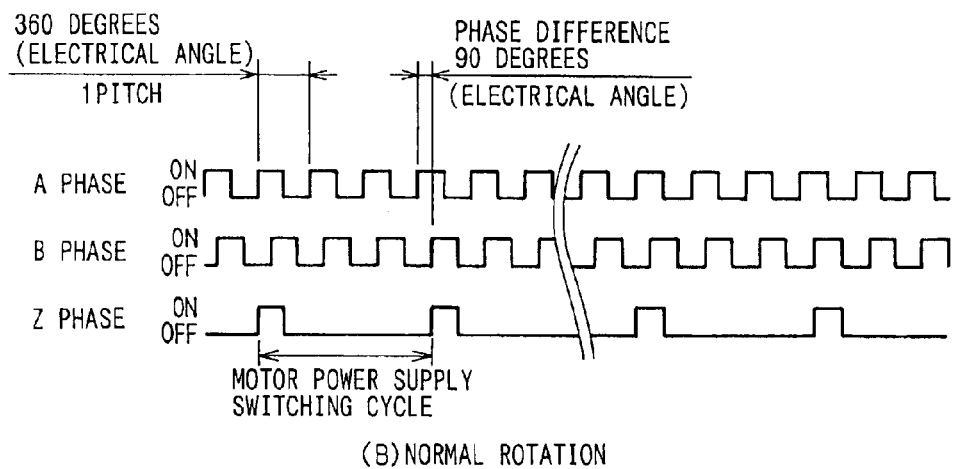
FIG. 12B is a rotational output waveform chart of A-, B-, and Z-phases when the rotor is rotated in the normal direction.
Figure 13:
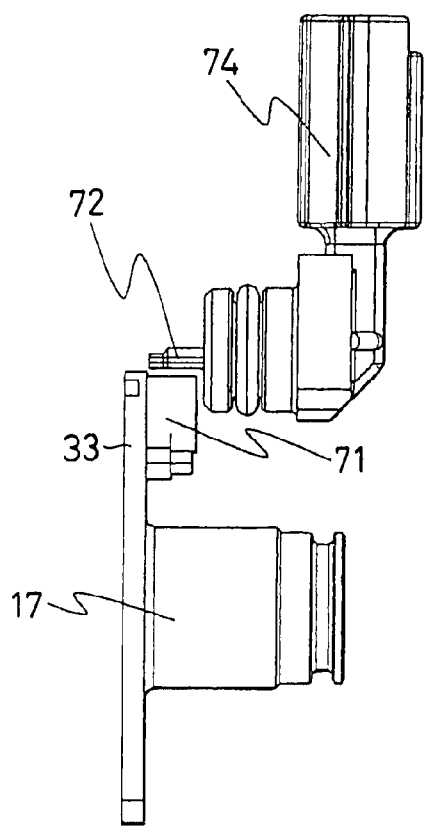
FIG. 13 is a side view illustrating the position at which an output angle sensor is mounted.
Figure 14:
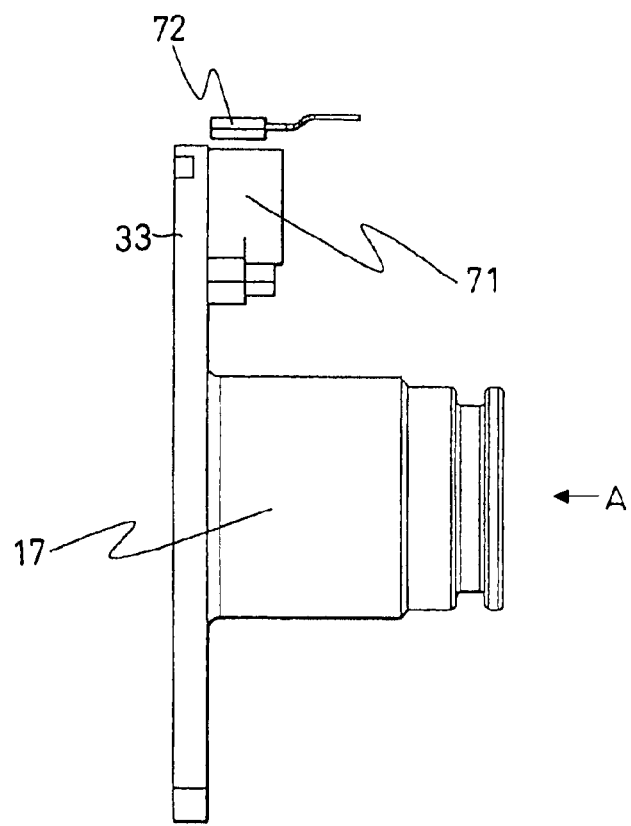
FIG. 14 is the same side view of FIG. 13 without the resin connector for the linear output Hall IC.

More specifically, the N and S poles of the magnet 61 alternate every 7.5° along the outer periphery as shown in FIG. 10, whereby the A- and B-phase outputs shown in FIGS. 12A and 12B are obtained for precise detection of the rotation angle of the rotor 11.

On the inner peripheral side of the magnet 61 are provided internal protrusions 61a that are spaced apart by 45°, S poles being located at the centers of the protrusions 61a and N poles adjoining both sides of the S poles in the rotating direction. The Z-phase output shown in FIGS. 12A and 12B for obtaining a synchronous signal of the motor 5 is attained based on magnetic pole changes in these internal protrusions 61a.

Figure 11:
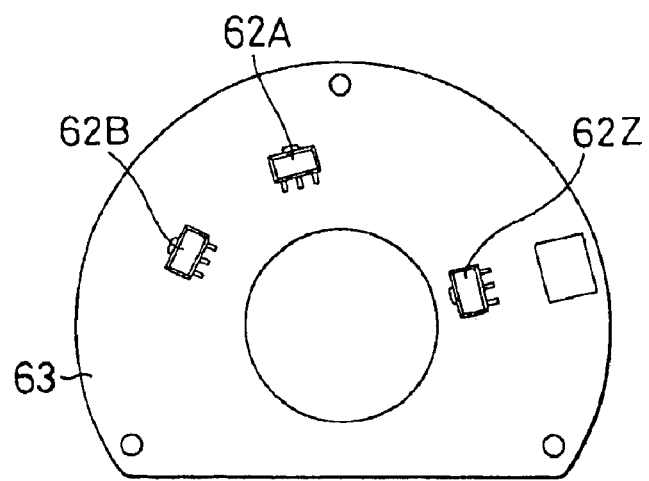
FIG. 11 is a plan view illustrating the layout of magnetic flux change sensors mounted on a substrate.

The first to third magnetic flux change sensors 62A, 62B, and 62Z detect a magnetic flux out of the magnet 61. They are constructed with elements that detect a change in magnetic flux, such as Hall ICs, Hall elements, MRICs, and the like. The first to third magnetic flux change sensors 62A, 62B, and 62Z are attached at locations shown in FIG. 4 for respectively detecting the A-, B-, and Z-phase output. More specifically, they are mounted on a substrate 63 as shown in FIG. 1 and FIG. 11 and assembled in the rear housing 20.

The first and second magnetic flux change sensors 62A and 62B are arranged on a circle opposite the outer periphery of the magnet 61 for obtaining A-phase and B-phase outputs according to the changes in the magnetic flux around the outer periphery of the magnet 61. The third magnetic flux change sensor 62Z is arranged on a circle opposite one internal protrusion 61a of the magnet 61 for obtaining a Z-phase output according to the change in the magnetic flux from the internal protrusion 61a.

FIG. 12A and FIG. 12B show the A-, B-, and Z-phase output waveforms obtained by the encoder 60. The A-phase and B-phase are output signals having a phase angle difference of 90° electrical degrees. In this embodiment, one cycle each of the A-phase and B-phase is output per a 15° rotation of the rotor 11. The Z-phase is an index pulse output per a 45° rotation of the rotor 11 and determines the relative positions of the power supply phase of the motor 5 and the A- and B-phases.

The rotary actuator 1 includes an output angle sensor 70 for detecting the rotation angle of the second shaft 17 so as to detect the selected shift range P, R, N, or D. This output angle sensor 70 will be described below with reference to FIG. 1 and FIG. 13 to FIG. 16.

Figure 15:
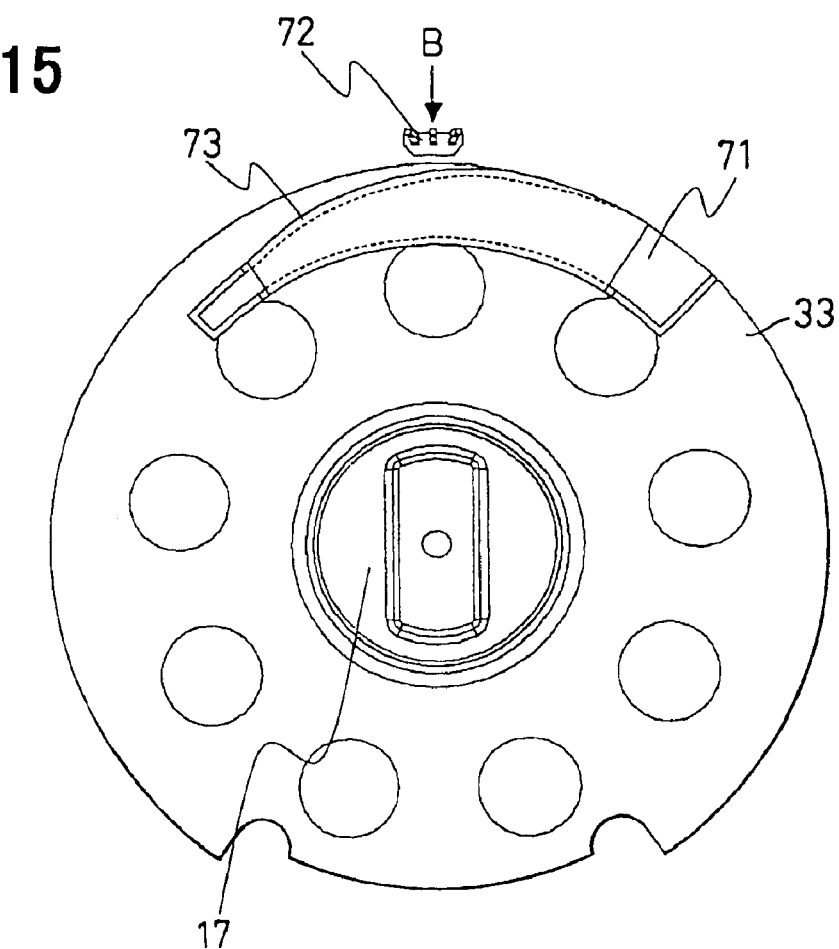
FIG. 15 is a view taken from the direction of arrow A of FIG. 14.

The output angle sensor 70 includes a magnet 71 fixed on the front face of the flange 33 that rotates integrally with the second shaft 17, and a linear output Hall IC 72. The magnet 71 is molded in resin 73 as shown in FIG. 15 for attaching it onto the flange 33. The magnet 71 is substantially crescent-shaped and magnetized such that the magnetic flux is orthogonal to the linear output Hall IC 72 in the direction of arrow B in FIG. 15. The distance between the magnet 71 and linear output Hall IC 72 is changeable in the rotation range of the second shaft 17 from the P to D shift range positions. More specifically, the distance between the magnet 71 and linear output Hall IC 72 is maximum when the second shaft 17 rotates to the D range position, whereas it is minimum when the second shaft 17 rotates to the P range position.

Figure 16:
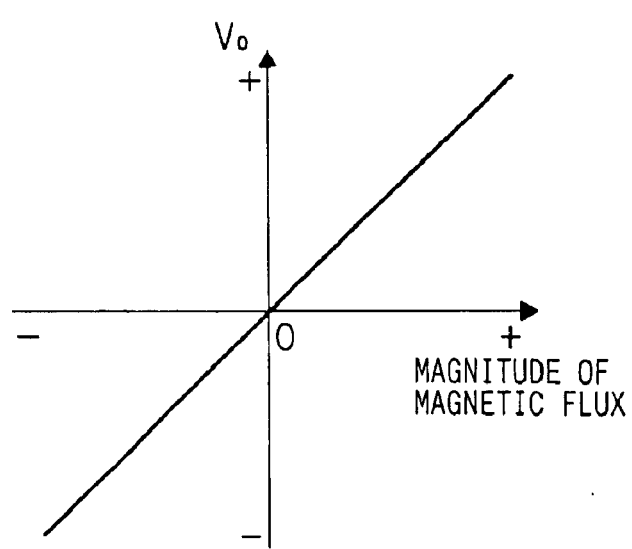
FIG. 16 is a graph showing the relationship between the density of the magnetic flux orthogonal to the linear output Hall IC and the output voltage.

The linear output Hall IC 72 is an element that generates an output in accordance with the distance from the magnet 71 or the density in magnetic flux orthogonal thereto. The element 72 is generally mounted using a resin connector 74. Its output voltage (Vo) is proportional to the density of the orthogonal magnetic flux, as shown in FIG. 16. Each output voltage value corresponding to the shift range position or rotation angle of the second shaft 17 is stored in an engine control unit (ECU) 80 shown in FIG. 2, so that the shift range that is currently selected is detectable from the output voltage of the linear output Hall IC 72.

The ECU 80 is constructed according to the following. When the range operation means (not shown) is operated by the driver, the ECU controls the rotation of the motor 5 to control the shift range selector 3 driven via the reduction gear 6, based on the shift range position or the rotation angle of the second shaft 17 detected by the output angle sensor 70, and the rotation angle of the rotor 11 detected by the encoder 60.

FIG. 2 shows a built-in battery 81, indicators 82, which are used for indicating the selected shift range and the state of the rotary actuator 1, including various other visual indication means used during normal driving such as alarm lights and alarm buzzers. Also shown are a drive circuit 83 for the motor 5, a speed sensor 84, and sensors 85 for detecting the states of the range operation means, brake switch, and various other elements.

The rotary actuator 1 of the present invention achieves the following effects:

Because the reduction gear 6 mounted in the rotary actuator 1 is a multi-point contact type, it has a larger load capacity than the prior art spur or worm reduction gear of the same size. In other words, the reduction gear 6 can be made smaller than the conventional types while maintaining the same load capacity or load handling capability. Accordingly, the rotary actuator 1 can be made smaller.

The motor 5 and the reduction gear 6 are both accommodated inside the space formed by the front housing 18 and the rear housing 20. The rotor shaft of the motor 5 doubles as the input shaft of the reduction gear and the first shaft 13. The rotary actuator 1 is thus compactly constructed.

The outer gear 26 of the reduction gear 6 meshes internally with the inner gear 27. This structure makes the axial dimensions smaller, thus reducing the axial dimensions of the rotary actuator 1.

The space between the automatic transmission 2 and vehicle body is usually as small as 40 to 50 mm to provide as much interior space as possible. Conventional bulky rotary actuators that use worm or spur reduction gears necessitated a vehicle body design that utilized a lot of interior space. In contrast, the rotary actuator 1 of the present invention is much smaller and more space efficient, thus overcoming the problem encountered by the prior art.

The reduction gear 6 has such a construction that it does not become mechanically locked unless there is a foreign substance lodged between the gears or a malfunction of the shafts. A damper or the like, which was necessary for preventing locking in the prior art worm reduction gear, can be omitted. Because the reduction gear 6 bears the load in multiple points, it has excellent durability and is highly reliable, contributing to the high durability and reliability of the rotary actuator 1.

The rotary actuator 1 uses a thin type encoder 60. The rotation angle of the rotor 11 is thus detected without sacrificing the compactness of the rotary actuator 1. High speed operation of the motor 5 without non-synchronization is made possible, and high response is achieved.

Because the SR motor does not use a permanent magnet as part of the motor 5, a possible lock of the rotary actuator 1 caused by a cracked, chipped, or dusted piece of magnet is prevented, and it generates very little reverse electromotive force. Also, the rotor moment of inertia is small. Hence, rapid acceleration/deceleration and a high response are achieved.

Because the SR motor does not generate cogging torque, positioning of the shift range selector 3 with a mechanism using a plate spring 47 is possible, with less mechanical stress. Because the SR motor is a stepping motor, high positioning precision is achieved. The SR motor has a high start-up torque and is advantageously used for driving the shift range selector 3, which requires a high starting load.

The SR motor has a relatively short length and is generally flat. These physical characteristics are possible because the winding is provided only in the stator and is a concentric winding with a short coil end. Furthermore, the SR motor is a brushless motor, so that there is no need to provide a space for accommodating brushes. The internally meshing planetary reduction gear used in the present invention also has a relatively short length and is generally flat. Thus, when the internally meshing planetary reduction gear is combined with the SR motor, a high torque actuator, which has a relatively short length and is generally flat, can be formed.

[Variations]

While one example of embodiment of the invention has been shown above in which the rotary actuator is adapted to the shift range selector 3 including the parking lock 4, it goes without saying that the invention can also be applied to other driven members mounted on a vehicle or any other driven members.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A rotary actuator according comprising:

a synchronous motor;

an internally meshing planetary reduction gear having a first shaft rotated by said synchronous motor;

an outer gear mounted to said first shaft with an eccentric part so as to be eccesntrially rotatable around said first shaft;

an inner gear with which said outer gear meshes internally;

a second shaft connected to said outer gear with transmission means that only transmits said outer near rotation on its axis to said second shaft, and an incremental encoder provided along said first shaft of said synchronous motor for detecting a rotation angle of a rotor of said synchronous motor in a rotating direction of said synchronous motor, wherein said incremental encoder further comprises:

a magnet that rotates integrally with said rotor and has multiple poles along a rotating direction;

magnetic flux detecting means fixed to the housing for detecting a change in magnetic flux when said magnet is rotated; and said incremental encoder is an incremental encoder for detecting the rotation angle of the rotor through said magnetic flux detecting means by counting the number of repetitions of the change in the magnetic flux, which is induced by the rotation of the magnet.

2. The rotary actuator according to claim 1 wherein said synchronous motor and said internally meshing planetary reduction gear are accommodated inside one housing, and said first shaft doubles as a rotor shaft of said synchronous motor.

3. The rotary actuator according to claim 1 wherein said synchronous motor is a switched reluctance motor.

4. The rotary actuator according to claim 1, further comprising: output angle detecting means for detecting a rotation angle of said second shaft.

5. The rotary actuator according to claim 1, wherein the rotary actuator is mounted in a vehicle and is used as a servo mechanism for positioning purposes.

6. The rotary actuator according to claim 5, wherein said servo mechanism switches between a lock state and an unlock state of a parking lock device of the vehicle.

7. The rotary actuator according to claim 5, wherein said servo mechanism switches between shift range positions of a vehicular automatic transmission.

8. The rotary actuator according to claim 1 said transmission means further comprising:

a flange that rotates integrally with said second shaft, wherein said flange defines a plurality of inner pin holes formed on a circle on said flange; and a plurality of inner pins fixed to said outer gear at a first pin end and loosely fitted in said inner pin holes.

9. The rotary actuator according to claim 1, wherein said outer gear defines a plurality of inner pin holes formed on a circle on said outer gear, and said transmission means comprises a plurality of inner pins fixed at one end to a flange that rotates integrally with said second shaft and that are loosely fitted in said inner pin holes.

* * * * *